A. PALMROS.
ELECTROPNEUMATIC TOOL.
APPLICATION FILED DEC. 13, 1904.
1,022,000.
Patented Apr. 2, 1912.
6 SHEETS—SHEET 1.
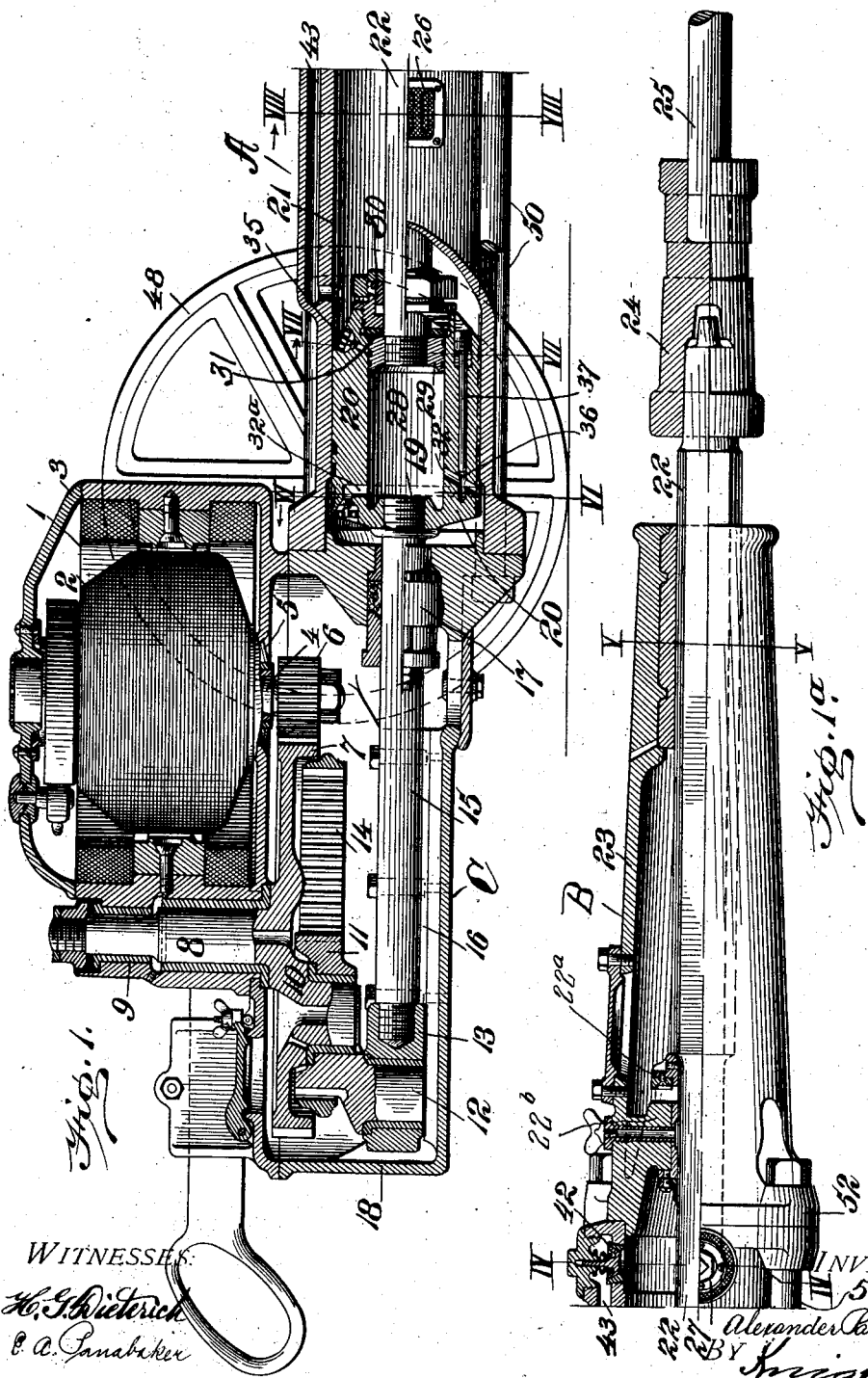

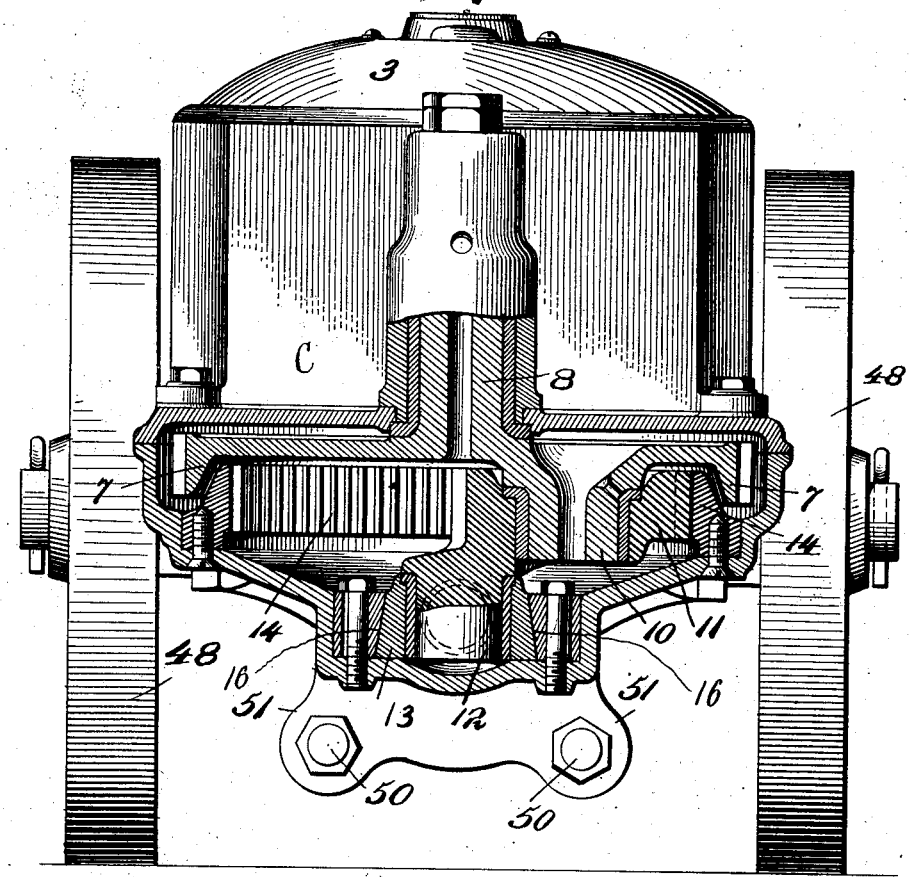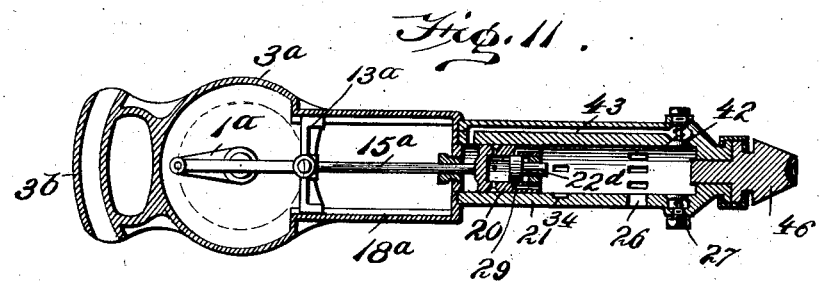

A. PALMROS.
ELECTROPNEUMATIC TOOL.
APPLICATION FILED DEC. 13, 1904.
1,022,000.
Patented Apr. 2, 1912.
6 SHEETS—SHEET 3.
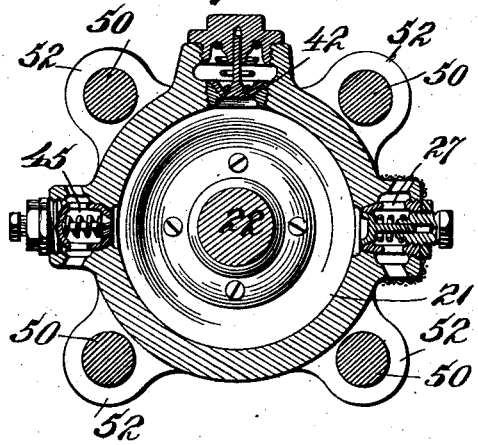
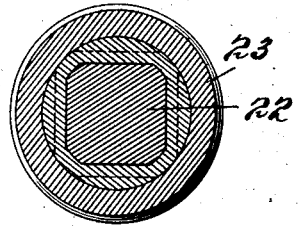
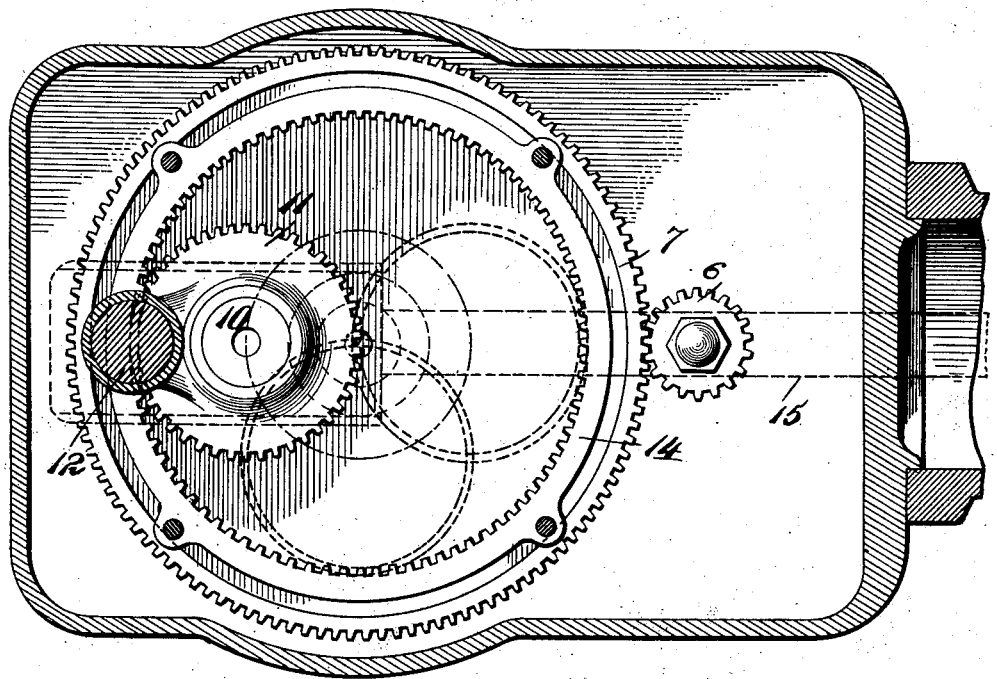

A. PALMROS.
ELECTROPNEUMATIC TOOL.
APPLICATION FILED DEC. 13, 1904.
1,022,000.
Patented Apr. 2, 1912.
6 SHEETS—SHEET 4.
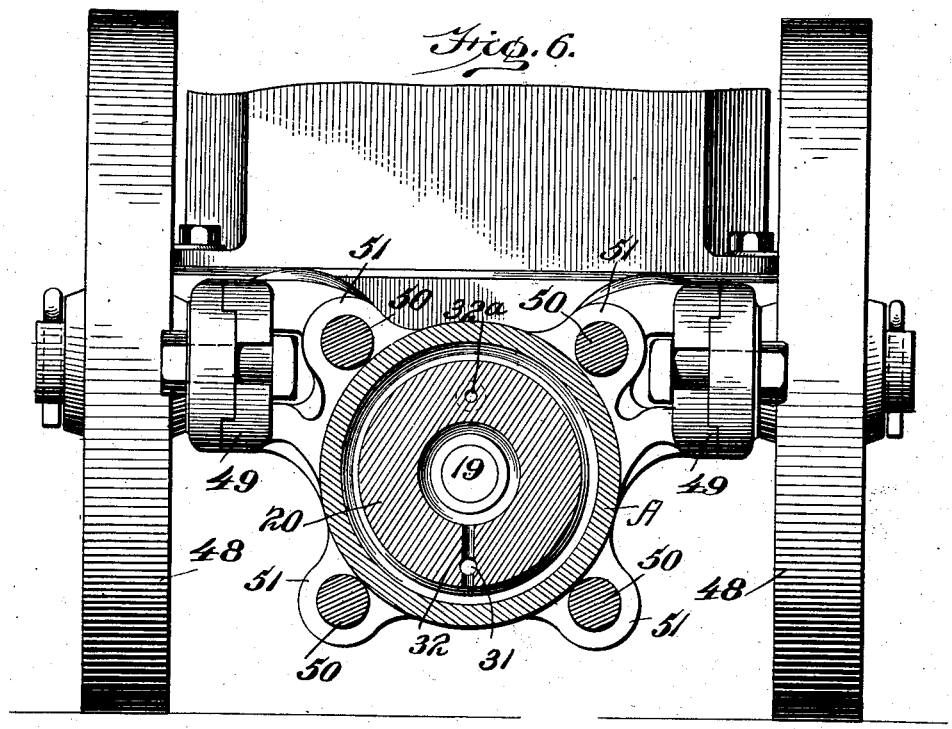
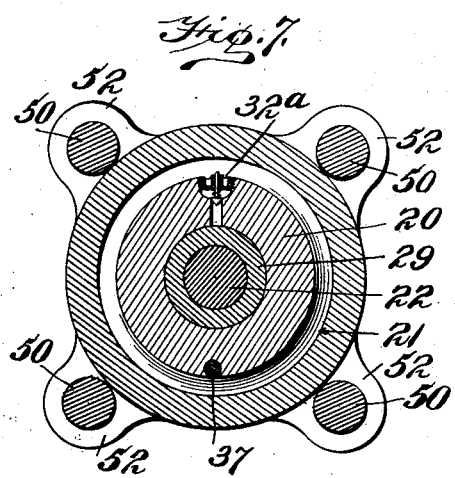
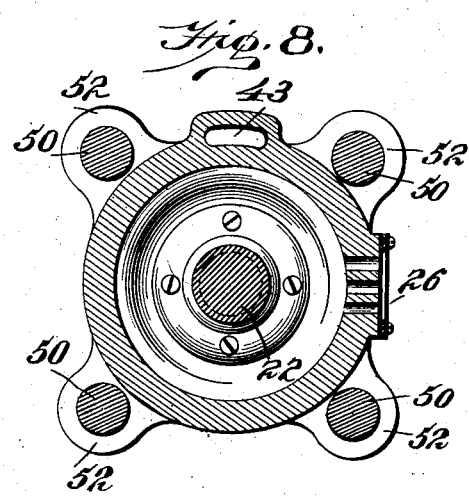
WITNESSES:
H. G. Dieterich
E. A. Panabaker.
INVENTOR
Alexander Palmros
BY Knight Bros
Attorneys A. PALMROS.
ELECTROPNEUMATIC TOOL.
APPLICATION FILED DEC. 13, 1904.
1,022,000.
Patented Apr. 2, 1912.
6 SHEETS—SHEET 5.
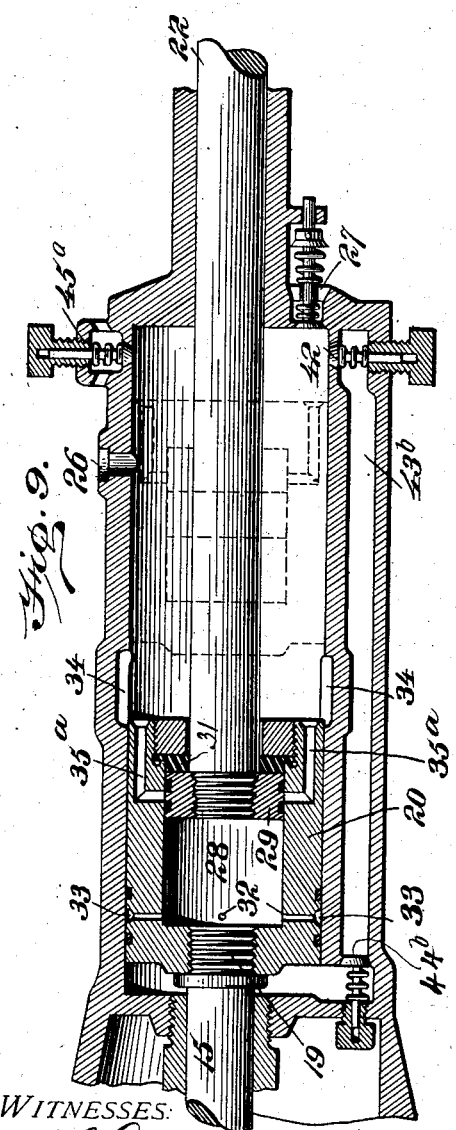
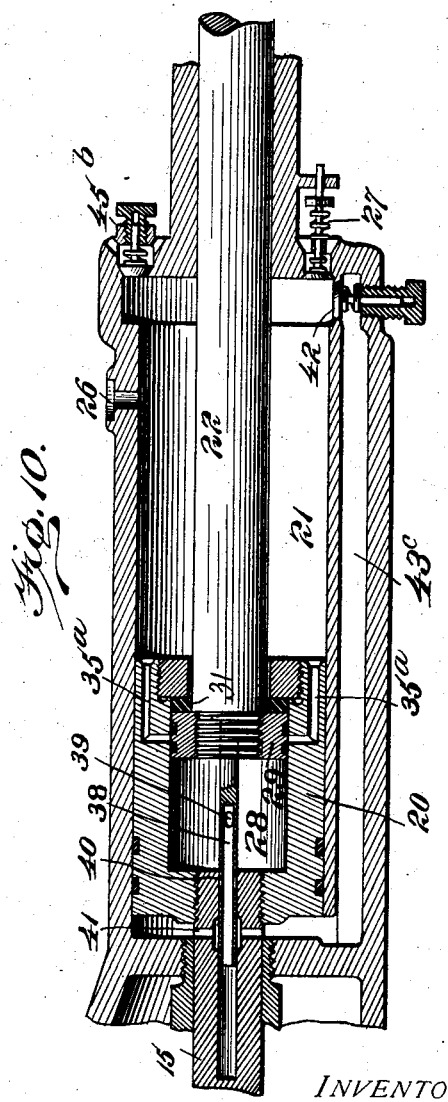

A. PALMROS.
ELECTROPNEUMATIC TOOL.
APPLICATION FILED DEC. 13, 1904.
1,022,000.
Patented Apr. 2, 1912.
6 SHEETS—SHEET 6.
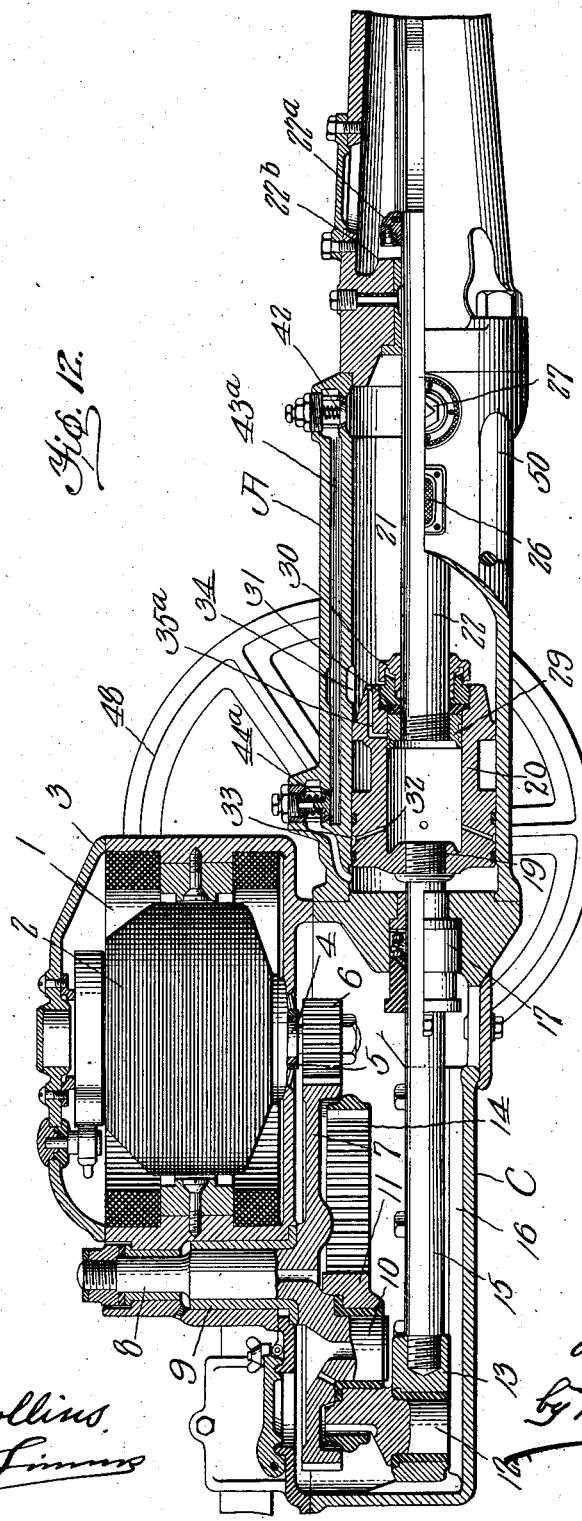
Witnesses
Jos. F. Collins.
J. H. Simms.
Inventor
Alexander Palmros.
By Knight Bros.
Attorney

UNITED STATES PATENT OFFICE.

ALEXANDER PALMROS, OF FAIRMONT, WEST VIRGINIA, ASSIGNOR TO THE PNEUM-ELECTRIC MACHINE COMPANY, OF SYRACUSE, NEW YORK, A CORPORATION OF NEW YORK.

ELECTROPNEUMATIC TOOL.

1,022,000.   Specification of Letters Patent.   Patented Apr. 2, 1912.

Application filed December 13, 1904. Serial No. 236,738.

*To all whom it may concern:*

Be it known that I, ALEXANDER PALMROS, a citizen of Finland, and a resident of Fairmont, in the county of Marion and State of West Virginia, have invented certain new and useful Improvements in Electropneumatic Tools, of which the following is a specification.

My invention relates more particularly to tools performing their work by percussion, and of the same general type as that described in U. S. Letters Patent No. 761,602 granted May 31, 1904 to Alexander Palmros and Carson W. Damron, and my invention consists in certain novel features of construction, hereinafter fully described and particularly pointed out in the claims.

In my present machine, I retain the advantages incident to permitting the tool to be driven forward, by the expansion of a pressure medium automatically maintained at high efficiency by an auxiliary or motor driven pump, as set forth in my patent above mentioned, and at the same time, I greatly increase the effectiveness of the blow. That is to say, I employ the driving piston as a pumping piston, but the pumping action takes place only during a small part of the forward stroke of the tool, and only after the full momentum of the parts has developed and at a period when a cushioning effect is desired; and the reinforcing air to be delivered to the compresion space is forced into a by-pass so that it can enter the compression space when the pressure is sufficiently reduced therein to require it; the pumping action is further prevented from materially reducing the impact stroke by the fact that the tool while free to drive ahead under the expanding pressure medium, is still being driven by the motor, for which reason the pumping action is independent of instead of being a burden upon the expanding force which develops the working stroke of the piston; and the effectiveness of the stroke is further increased by the combined effect of two additional distinct agencies, namely, the momentum of the armature acting as a fly wheel, and the continued driving force of the field acting on the armature, notwithstanding the latter, by its peculiar relation to its driving member is free to race ahead under the expanding force of the pressure medium; that is to say, in the novel combination of a prime mover, preferably an electric motor, whose driven member is capable of racing ahead or quickening its movement during the impact stroke of the machine, while still receiving the driving force which normally impels it and the constantly connected reciprocating tool piston which compresses the pressure medium on its rearward stroke and is accelerated by the expansion of said medium on the forward stroke, the driving member in this combination, acts in supplement of, or as an auxiliary to the expanding pressure-medium, both in the acceleration of the forward stroke, and in the storing up of work (due to increased mass of connected moving elements) to be expended in the impact.

It is true that the fly wheel effect is not transmitted directly to the drill, but indirectly through piston connection which yields slightly at the instant of first impact, to relieve the shock on the machine, but the construction is such that the body of air through which this reinforce of blow is exerted is kept supplied in a dense condition and the effect is therefore peculiarly advantageous for the excavation of many materials, where a prolonged crushing blow is most effective. That is to say, while there is a slight yield at first, the blow is followed up by the additional force before the material attacked can recover from the first load impressed upon it and the penetration is greater than results from a construction where the first shock is transmitted to and tends to arrest the entire train of driving parts.

In the accompanying drawings forming part of this specification, Figures 1 and 1ª show a vertical axial section, partly in elevation, of a coal mining machine in which my invention is embodied by way of illustration, the working end of the bit, which may be of any usual construction, being broken away. Fig. 2 is a rear elevation of the same on an enlarged scale, the gear casing being in section in the vertical transverse plane of the main gear spindle. Fig. 3 is a plan view of the gear seen from below with its casing in section, and the retracting rod with its sliding head shown in dotted lines. Figs. 4 and 5 are transverse sections taken respectively on the lines IV—IV and V—V, Figs. 1—1ª, looking forward. Fig. 6 is a front elevation of the machine with the cylinder in section on the line VI—VI Fig. 1, and the upper part of the motor casing broken away. Figs. 7 and 8 are transverse sections taken respectively on the lines VII—VII and VIII—VIII Fig. 1. Figs. 9 and 10 are axial sections showing two other structural embodiments of the pneumatic features of my invention. Fig. 11, is an axial sectional view showing the application of my invention to that class of tools, such as riveting tools, chippers, stone drills and the like, in which the working end is held in contact with the work during use while reciprocation is imparted to the percussive member to develop the driving impact. Fig. 12 is a sectional view of another constructional embodiment of the invention.

The general arrangement of the machine herein adopted for illustrating the principles of my invention, is such as to reduce the size and dimensions to a minimum and the exterior lines to a form which is convenient to the position that must be assumed by the operator, and which facilitates manipulation. With these objects in view, the frame or casing of the machine as will hereinafter appear, is divided into three main parts, namely, the intermediate main cylinder A directly mounted on the wheels and carrying the means for developing and utilizing the fluid pressure, the forward plunger guide carrying the plunger to be actuated, and the rear gear and motor casings carrying the prime actuating and transmitting mechanisms which front and rear members are fitted to the ends of the main cylinder and tied together and secured to said cylinder by tie rods. To economize space in this general arrangement, the motor 1 having armature 2 is mounted in a casing 3 forming the upper forward part of the casings C, while the motor shaft 4 has its lower bearing 5 in a spider in the upper wall of the gear casing and terminates in a pinion 6 within said casing. A large reduction gear 7 mounted upon a spindle, 8, transverse to the reciprocating member of the machine, and extending vertically, in rear of the motor, into a bearing 9 on the motor casing, receives motion from motor pinion 6, and transmits said motion through an eccentric pin 10. In order to convert the throw of the eccentric pin 10 into a right-line movement coincident with the axis of the reciprocating member, said pin carries a crank pinion 11 having a wrist pin 12 which connects with the cross-head 13 of the reciprocating member, and whose throw, due to the rotation of pinion 11, is exactly half the stroke to be imparted to the cross-head, while said pinion 11, by meshing with fixed circular rack 14, receives one rotation about its center, for each revolution of its center with main gear 7.

To develop the stroke, cross-head 13 is connected to a retracting bar 15, and slides between adjustable under cut guides 16, which retracting bar 15 works through the packing gland 17, and connects at 19 with the main piston 20 which operates in the cylindrical bore 21, to compress air or other fluid pressure medium on its rearward stroke and to be impelled by said fluid pressure on its forward stroke and made to deliver a forcible blow through the plunger 22 controlled by said piston. Plunger 22 is guided in the forward extension or casing 23, and in the present illustrative embodiment, extends beyond said casing to receive any suitable bit socket 24, and bit 25. Exhaust port 26 permits escape of air from in front of piston 20, during the greater portion of its forward stroke, and a valved intake port 27 supplies air to overcome the vacuum during the first part of the rearward stroke.

To insure a full stroke of the machine, it will be observed that the driving motor is continuously in fixed driving connection with the piston 20 so that the piston must move to the end of its forward stroke at each revolution of the driving gear. This continuously fixed driving connection permits the forward stroke under the influence of the fluid pressure that has been developed by the inward stroke, this being due to the driven member of the motor, in this case the armature, racing ahead of its driving member and yet being at all times in such relation to the latter member that the driving influence will be exerted the instant the expanding fluid pressure ceases to race the piston.

While I have shown an electric motor and prefer to use this type of driving power, it is obvious that other known forms of prime movers or even various forms of driving connections from exterior sources of power might be utilized to actuate the machine and still maintain the described relations between the driving power and the reciprocating member.

To cushion the tool, avoid arresting the forward stroke of the main piston by an obstruction to the plunger and to avoid the running forward of the main piston in the event of such an obstruction, the plunger 22 is connected to the piston 20 not directly but indirectly through the medium of a cushioning chamber 28 and piston 29 working therein, so that when the plunger strikes a hard place in the coal (for instance) which obstructs its advancement to the full extent of the stroke of the machine, main piston 20 may continue its forward movement, compressing air behind the piston 29, and when the compression stroke of main piston 20 commences, the pressure behind piston 29 will force the plunger to return to its forward position in the piston 20; or if the bit binds in the mineral and resists retraction after being thus obstructed in its forward movement, the main piston 20 will move rearward independently of plunger 22 until piston 29 reaches the forward end of the cushioning chamber which acts as a shoulder, and after the momentum of the rearward stroke has materially developed, will draw the bit from the mineral.

30 represents a packing gland for the plunger 22 and 31 is a packing and cushioning ring placed between said gland and the piston 29.

In order to maintain sufficient pressure in the cushioning chamber 28, said chamber communicates through passages 32 with the main cylinder 21. This may occur when said passages reach the enlarged portion of the main cylinder on the rearward stroke of the piston as shown in Fig. 1 or it may occur when the annular groove 33 communicating with passages 32, passes a recess 34 in cylinder 21 of sufficient length to establish momentary communication between the groove 33 and the pressure space behind the main piston, as shown in Figs. 9 and 12; or the same effect may be produced by having a stem 38 connected with the piston 29 working in a bore in the retractor bar 15, having a port 39 communicating with cushion chamber 28, and ports 40 which communicate with a transverse bore 41 leading to the pressure space behind the main piston, so that whenever the pressure in the chamber 28 becomes so far reduced that it will not drive the plunger to its full stroke, and main piston 20 moves forward relatively to the plunger 22, the passage 41, 40, 38, 39, is opened to restore pressure to the chamber 28. According to the construction shown in Fig. 1, a valved passage 35 permits the escape of air in front of piston 29 as it returns to its seat, the position of this passage, however, being such that some air is trapped to reduce the blow on the forward head of chamber 28; also a port $32^a$ may be provided in chamber 28 with a spring loaded valve of such resistance that it will resist the desired pressure in chamber 28, but will open under excessive pressure therein and thus maintain the cushioning effect on the plunger 22 at precisely the desired degree. In Figs. 9 and 10, these ports marked $35^a$, are duplicated and shown without a valve. In Fig. 1 the port 32 is intersected by a longitudinal bore 36 in which is located an adjustable valve 37 to regulate the opening 32 and consequently the inlet of pressure to chamber 28.

$22^a$ represents a cushioned shoulder on plunger 22. Should the piston 29 occupy a rearward position in chamber 28 when the machine makes its rearward stroke, this shoulder $22^a$ will impinge the abutment $22^b$, and arresting the rearward stroke of the plunger, will insure full space in rear of piston 29, in chamber 28; the cushioning body of air trapped in front of piston 29, in consequence of the position of valved passage 35, serves to prevent shock on the parts at this time.

From the foregoing description, it will be observed that the retracting and striking members or the opposed faces thereof, through means of which one exerts its influence over the other, are separated by a body of air through which such control is exerted.

To maintain initial pressure on the compression side of the main piston, the exhaust port 26 is so disposed and other ports are so provided that the terminal portion of the forward stroke of the main piston 20 acts as a pump and delivers pressure to its rear side, at the same time cushioning said main piston and greatly relieving the shock on the actuating mechanism of the tool.

In Figs. 1 and $1^a$, 43 represents a longitudinal passage in the cylinder 21 which communicates through a valved port 42 with the forward end of cylinder 21 and discharging again into the cylinder 21 at a point that will be behind piston 20 when it reaches its forward limit. In order to avoid loss of pressure, the passage 43 is made short in Figs. 1, $1^a$, but this passage may be made to extend the full length of cylinder 21 as shown at $43^a$, $43^b$ and $43^c$ in Figs. 9 and 10 respectively and, as shown in Figs. 9 and 10, it may be provided at its rear or discharge end with an additional check valve $44^a$ or $44^b$ so as to avoid the necessity of compressing the full capacity of the passage at each stroke, it being obvious that as the piston recedes from the valve 42, both this valve and valve $44^a$ or $44^b$ will close and retain a column of air under the full pressure developed by the priming stroke of the piston, so that each time initial pressure is supplied through the passage 43, $43^a$, $43^b$, $43^c$ loss due to the extent of the passage will be avoided.

Regulating the initial pressure is accomplished with great accuracy by means of a relief valve 45, $45^a$ or $45^b$ Figs. 4, 9 and 10, the tension of whose spring may be readily regulated. Since the pressure developed by the primary stroke of the main piston depends upon the resistance of its relief valve, it follows that the initial pressure delivered to the compression side of the main piston, and consequently the force of the stroke of the machine, may be regulated at will by merely increasing or diminishing the tension of the closing spring of the valve 45.

Riveters, chippers, etc., (Fig. 11) may be constructed according to my invention, by having the fixed bit 46 in the path of the plunger 22ᵈ, the remaining portions of the machine being as already described and the machine having a handle 3ᵇ on its casing 3ᵃ. External motors might also be employed as suggested by the crank 1ᵃ, cross-head 13ᵃ, and retractor 15ᵃ in the casing 18ᵃ.

48 represents the wheels which are longitudinally adjustable through connections 49 of known construction.

50 represents the tie-rods passing through ears 51, 52 on the rear and forward casings and binding these parts firmly to the main cylinder 21.

Having thus described my invention, the following is what I claim as new therein and desire to secure by Letters Patent:

1. In a power driven reciprocating tool, the combination of a cylinder, a reciprocating member having a piston working in said cylinder and compressing an expansible medium on its rearward stroke and driven by said expansible medium on its forward stroke, and an electric motor having its armature in continuously fixed driving connection with the reciprocating member and free to rotate independently of the motor power and race ahead under the influence of the compressed medium during delivery of the stroke of the machine.

2. The combination with a motor comprising a driving stationary part and a rotating part, capable of racing ahead of the driving force, of a reciprocating member having continuously fixed driving connection with the rotating part of the motor, and means in which power is stored during one stroke of the reciprocating member, acting on the rotary part of the member to cause said part to race ahead of its driving force.

3. The combination with an electric motor, of a reciprocating member having continuously fixed driving connection with the armature, and means in which power is stored during one stroke of the reciprocating member, acting on the armature to cause it to race ahead of its driving force.

4. The combination with a retracting and a striking member, of means constructed to store air compressed on the retracting stroke of the retracting member, and means utilizing said compressed air to cause the impact of the striking element, the retracting and the striking elements being separated by an air space through which one exerts control over the other.

5. The combination with a motor comprising a driving stationary part and a rotating part, capable of racing ahead of the driving force, of a reciprocating member having continuously fixed driving connection with the rotating part of the motor, means in which power is stored during one stroke of the reciprocating member, acting on the rotary part of the member to cause said part to race ahead of its driving force, and a yielding connection interposed in said reciprocating member.

6. The combination with an electric motor, of a reciprocating member having continuously fixed driving connection with the armature, means in which power is stored during one stroke of the reciprocating member acting on the armature to cause it to race ahead of its driving force, and a yielding connection interposed in said reciprocating member.

7. The combination with a motor comprising a driving stationary part and a rotating part, capable of racing ahead of the driving force, of a reciprocating member having continuously fixed driving connection with the rotating part of the motor, means in which power is stored during one stroke of the reciprocating member, acting on the rotary part of the member to cause said part to race ahead of its driving force, and a yielding connection interposed in said reciprocating member comprising a cylinder containing a yielding medium and a piston against which the yielding medium exerts its force.

8. In a power driven reciprocating tool, the combination of a reciprocating member, a cylinder and piston by which an expansible medium is compressed by the rearward stroke of the reciprocating member and through which it exerts its expanding force in the forward stroke of the reciprocating member, a cylinder and piston by which a yielding connection is made between the working end of the tool and its actuating power and means whereby pressure developed in the reciprocation of the tool, is communicated to the yielding connection cylinder to maintain pressure therein and hold its piston in working position.

9. In a fluid pressure tool, having a piston working in a cylinder, compressing a fluid on its rearward stroke and utilizing said fluid pressure on its forward stroke; a yielding connection between the piston and the tool operating part, consisting of a yielding connection cylinder communicating with the cylinder first named and receiving pressure therefrom and containing a piston carried by the tool operating part, and means controlling the communications between the yielding connection cylinder and the cylinder first named, to regulate the pressure communicated to the yielding connection cylinder and thereby regulate resistance of the yielding connection.

10. In a power driven reciprocating tool, the combination of a reciprocating member, a cylinder, a piston, one end of which is connected with the reciprocating member and by which an expansible medium is compressed by the retraction of the reciprocating member and exerts its expansible force during the opposite movement of the reciprocating member, a second cylinder, a piston interposed as a yielding connection between a portion of the reciprocating member and its working end, and connections whereby pressure developed by the movement of the reciprocating member is communicated to the yielding connection cylinder.

11. In a power driven fluid pressure tool, the combination of a plunger for operating the tool, a main cylinder in which the plunger works, a main piston, means for retracting the piston to compress an expansible medium in the main cylinder for use in driving the main piston forward, a cylinder constructed within the main piston, a yielding connection piston connected with the plunger and working in the cylinder within the main piston, and connections communicating pressure from the main cylinder to the cylinder within the main piston, whereby the driving power is imparted to the plunger through fluid pressure.

12. In a power driven pressure tool, the combination of a plunger, a main cylinder in which said plunger works and a main piston by which the plunger is reciprocated; the piston on the plunger, by which the plunger is connected to the main piston said piston on the plunger working in a cylinder within the main piston, and said cylinder within the main piston having communication with the main cylinder at intervals to supply pressure in the cylinder within the piston and having a relief valve opening under excessive resistance to the plunger.

13. The herein described yielding connection consisting of a cylinder and piston, means introducing fluid under pressure behind the piston and means permitting escape of air in front of the piston located to trap a cushioning body of air at such point.

14. In a power driven fluid pressure tool, in which the rearward stroke develops fluid pressure that exerts its force on the forward stroke, a yielding connection through which the tool performs its work, consisting of a cylinder and piston, the former of which is provided with a passage in rear of the yielding connection piston receiving pressure developed by the rear stroke.

15. In combination with an actuating member, a plunger to be actuated, and a yielding connection cylinder and piston through which the plunger is actuated; a shoulder on the plunger, and an abutment on a part fixed relatively to the plunger impinged by said shoulder, on the rearward stroke of the tool, when the yielding connection piston remains rearward in its cylinder.

16. In a power driven fluid pressure tool, the combination of a main cylinder, a main piston having means for moving it in one direction in the main cylinder to develop fluid pressure therein and permit it to move in the other direction under the action of such fluid pressure, and a plunger having cylinder and piston connection with the main piston; the cylinder forming a part of said connection having a relief valve which opens under excessive resistance to the stroke of the plunger and having an outlet valve communicating with its forward end to permit return of the plunger to normal position relatively to the main piston.

17. In a power driven fluid pressure tool, the combination of a motor, a reciprocating member with which the motor has suitable connection, a main cylinder, and a main piston carried by the reciprocating member, by which fluid pressure is developed in the rearward movement of the reciprocating member and through which such fluid pressure is exerted to drive the reciprocating member forward; said main cylinder and main piston being provided with ports and passages through which the main piston develops pressure in the main cylinder in front of the main piston, during the terminal portion of its forward stroke and delivers said pressure to the main cylinder in the rear of the main piston, to maintain an initial pressure on the rear side of the piston.

18. In a power driven fluid pressure tool, the combination of a main cylinder and piston, a reciprocating member producing relative movement between said piston and cylinder in its rearward stroke and receiving driving power from such pressure during its forward stroke, a motor having continuous connection with the reciprocating member and insuring the completion of its forward stroke, and means whereby the terminal portion of the forward stroke of the main piston develops and delivers an initial pressure to the rear of said piston.

19. In a fluid pressure tool of the character described, the combination of a main cylinder, a main piston working in said cylinder to compress fluid therein on its rearward stroke and to utilize the expansible force of said fluid on its forward stroke, said cylinder having an outlet permitting escape of the pressure medium in advance of the piston during a part of its forward stroke, means communicating the pressure developed by the terminal portion of said forward stroke to the rear of the piston, a check valve to prevent return of said pressure during the rearward compression stroke of the piston and a valve opening into the forward end of the main cylinder under external pressure during the rearward stroke of the piston.

20. In a fluid pressure tool of the character described, the combination of a main cylinder, a main piston working in said cylinder to compress fluid therein on its rearward stroke and to utilize the expansible force of said fluid on its forward stroke, said cylinder having an outlet permitting escape of the pressure medium in advance of the piston during a part of its forward stroke, means communicating the pressure developed by the terminal portion of said forward stroke to the rear of the piston, a check valve to prevent return of said pressure during the rearward compression stroke of the piston, a valve opening into the forward end of the main cylinder under external pressure during the rearward stroke of the piston and a relief valve opening under excessive pressure developed by said terminal portion of the forward stroke of the piston.

21. In a fluid pressure tool of the character described, the combination of a main cylinder, a main piston working in said cylinder to compress fluid therein on its rearward stroke and to utilize the expansible force of said fluid on its forward stroke, said cylinder having an outlet permitting escape of the pressure medium in advance of the piston during a part of its forward stroke, means communicating the pressure developed by the terminal portion of said forward stroke to the rear of the piston, a check valve to prevent return of said pressure during the rearward compression stroke of the piston, a valve opening into the forward end of the main cylinder under external pressure during the rearward stroke of the piston and a relief valve opening under excessive pressure developed by said terminal portion of the forward stroke of the piston; said relief valve having means for regulating its resistance to opening, whereby the pressure developed in front of the piston at the end of its forward stroke and consequently the initial pressure delivered in rear of the main piston, may be regulated at will.

22. In a tool of the character described in which the piston compresses at the end of its forward stroke to supply initial pressure in rear of the piston, the combination of a cylinder, said cylinder having a passage extending from one end of the cylinder to the other and check valves in said passage near its ends whereby pressure is maintained in said passage for the greater portion of its length to prevent loss at each stroke.

23. The combination with the suitably housed piston, of means for storing a compressed fluid upon one face of said piston to drive the piston in one direction, means for furnishing communication between both faces of said piston to lead the fluid from one face to the other, and a valve controlling said communication, opening during the driving movement and closure during the compression movement.

24. The combination with the motor, of a suitably housed piston moved in one direction by the motor, means storing a fluid compressed by the piston during such movement, to drive the piston in the other direction, means for furnishing communication between both faces of said piston, and a valve controlling such communication, opening during the driving movement and closing during the compression movement.

25. The combination with a suitably housed piston, of means confining a fluid and subjecting it to the compression action of one side of said piston, means for furnishing a communication between opposite sides of the piston, and a valve controlling said communication, opening during one movement of the piston and closing during the other movement of the piston.

26. The combination with a piston, of a cylinder having an outlet to atmosphere near one end and coöperating with said piston to cause the compression of a fluid near the opposite end of the cylinder, and a valved communication between the compression end of the cylinder and the other end beyond the outlet.

27. The combination with a piston, of a cylinder in which the piston works formed so as to permit the piston to compress a fluid at one end thereof, and having an outlet to atmosphere near its other end, and a valved communication between the compression end and other end beyond the outlet, whereby the piston is permitted to at first move freely under the action of the compressed fluid and then partially charge the compression space.

28. The combination with a motor, and a piston constantly driven by the motor, of a cylinder in which the piston works, formed so as to permit the piston to compress a fluid at one end thereof and having an outlet to atmosphere near its other end, and a valved communication between the compression end and the other end beyond the outlet.

29. In a fluid pressure tool, a compression chamber in which fluid is compressed during the retracting stroke of the tool, a suitably housed piston having its percussive stroke imparted by the compressed fluid, and means causing said fluid to supply the compression chamber with fluid during the latter part of the percussive stroke.

30. The combination of the suitably housed driving and tool carrying pistons, retracting connection between the pistons, means storing a fluid compressed by one side of the driving piston, and utilizing said fluid to develop the working stroke, and means admitting fluid between the opposed walls of the pistons from the compression side of the driving piston.

31. The combination of suitably housed compressing and tool-bearing pistons, means whereby one piston retracts the other after delivery of the stroke, means for storing a fluid compressed by the compressing piston, and means for admitting fluid between opposed walls of the pistons from the compression side of the compressing piston, during the compressing movement.

32. The combination with a cylinder, of a piston movable therein, to compress a fluid on one stroke, means for delivering fluid from one side of the piston to the other during the other stroke of the piston, and a tool operated by the compressed fluid.

33. The combination with a motor of an element constantly driven by the motor, a tool carrying element, means for causing the tool carrying element to move with a percussive stroke, and means confining a body of air between the tool carrying element and the motor-driven element to cause the tool to penetrate a material after the material has been fractured by the percussive stroke.

34. The combination with a motor, of a motor driven element, a tool carrying element, a yielding connection between said elements, and means for causing the tool carrying element to deliver a percussive stroke.

35. The combination with a motor, of a motor driven element, a tool carrying element, a yielding connection between said elements, means for causing the tool carrying element to deliver a percussive stroke, and means establishing retracting relation between the elements.

36. In a pressure driven percussive tool, the combination of a driving element, a tool carrying element, means confining a body of air between opposed walls of said elements, means causing the compression of a fluid to develop the tool driving pressure, upon the movement of the driving element in one direction, and means for delivering a portion of said compressed fluid to the space between the opposed walls of the elements to keep up the pressure of the body of air therebetween.

37. In a fluid pressure driven tool, the combination of a reciprocating tool carrying member mounted to have a retracting stroke in one direction and a percussion stroke in the opposite direction, a driving means to exert driving power upon said reciprocating tool carrying member during both its retracting and precussion strokes, and means constructed to develop fluid-pressure during the retracting stroke of the reciprocating tool carrying member and to cause the pressure thus developed, to act upon the reciprocating member in supplement to the driving power during movement in the direction of the percussion stroke and thereby developing an effective percussion stroke in the machine.

38. In a fluid pressure driven tool, the combination of a reciprocating tool-carrying member mounted to have a retracting stroke in one direction and a percussion stroke in the opposite direction, a driving means to exert driving power upon said reciprocating tool-carrying member during both its retracting and percussion strokes and means constructed to develop fluid pressure during the retracting stroke of the reciprocating tool-carrying member and to cause the pressure thus developed, to act upon the reciprocating member in supplement to the driving power during movement in the direction of the percussion stroke and thereby developing an effective percussion stroke in the machine; said pressure developing means being provided with a connection through which its initial supply of pressure-fluid is maintained by the driving power.

39. In a fluid pressure driven tool, a tool carrying element, a driving element, means for confining between opposed walls of said elements a body of air through which the driving element drives the tool carrying element on the working stroke of the latter, means causing the compression of air upon the retracting stroke of the driving element, and means delivering air thus compressed between the driving and the tool carrying elements to raise the pressure of the confined body of air between said elements.

40. In a reciprocating tool, the combination of a wheeled mounting by which the tool is advanced to its work having a reciprocating tool-carrying element mounted thereon, a constantly running fluid-compressing means carried on said wheeled mounting and running independently of the tool carrying element, a fluid-pressure-driven reciprocating element imparting its reciprocations to the tool carrying element, and means whereby the reciprocating element acts directly through the fluid pressure medium to impart motion to the tool carrying element in the direction and at the end of the working stroke of the latter.

41. In a fluid pressure tool, the combination of a wheeled mounting by which the tool is advanced to its work, a constantly running rotary driver carried on said wheeled mounting, a tool-carrying element having bearings on said mounting which permit it to reciprocate thereon, a piston mounted on said wheeled mounting, actuated in both directions by the rotary driver, a cylinder in which said piston compresses a fluid medium on its retracting stroke said cylinder being closed to the escape of the fluid medium thus compressed, whereby said medium acts expansively to develop the working stroke and said piston imparts its reciprocations to the tool-carrying element, and said cylinder being constructed to confine a body of air between said piston and tool-carrying element which cushions the forward impulse transmitted from the piston to the tool-carrying element.

The foregoing specification signed at Fairmont, W. Va., this 26th day of November, 1904.

ALEXANDER PALMROS.

In presence of—
T. W. BOYDSTON,
CLARA BOYDSTON.

Copies of this patent may be obtained for five cents each, by addressing the "Commissioner of Patents Washington, D. C."